Sept. 3, 1946.  J. BELADA  2,407,053
FILING MACHINE
Filed May 27, 1944  2 Sheets-Sheet 1
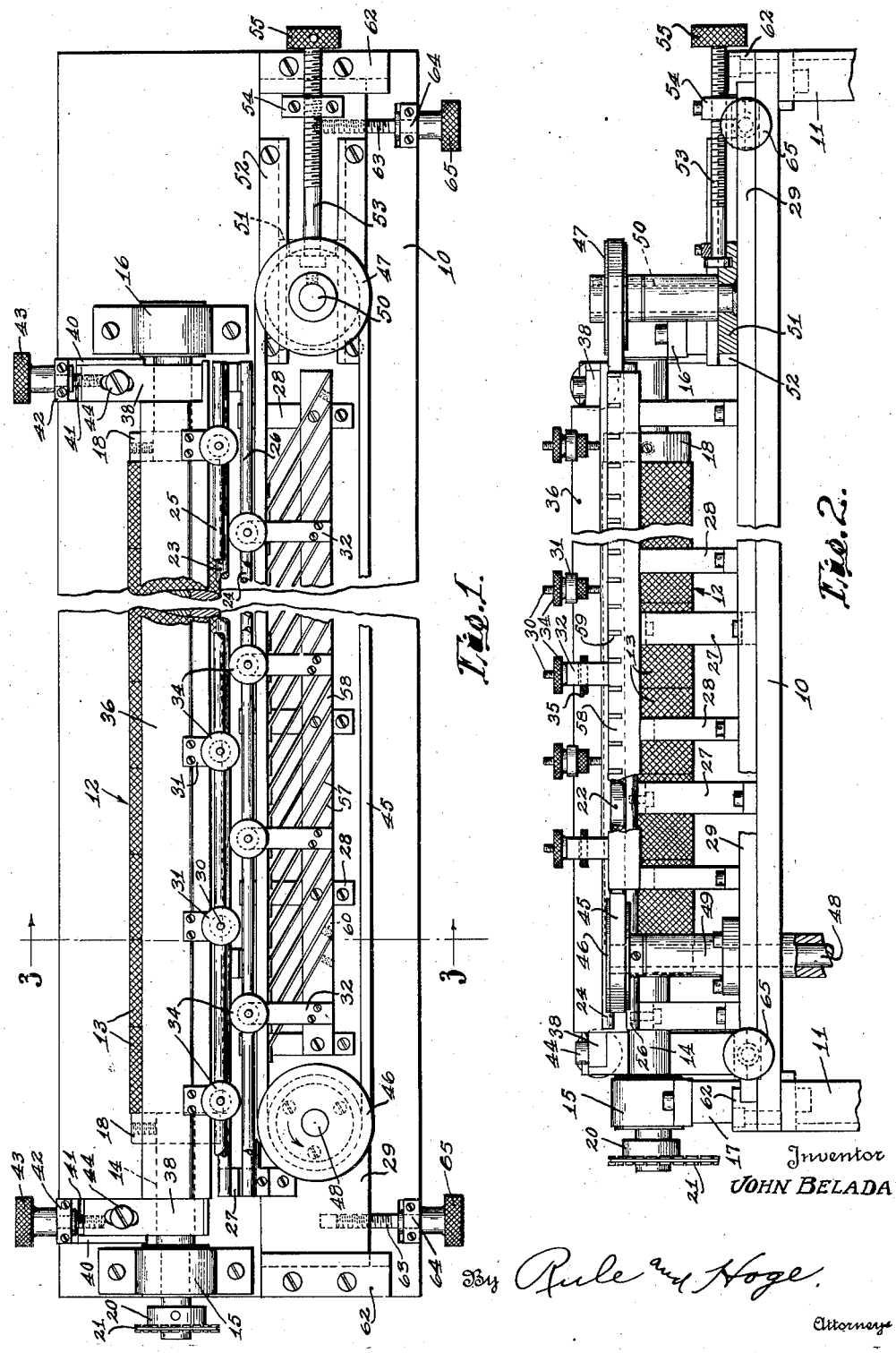
Inventor
JOHN BELADA
By Rule and Hoge
Attorneys Sept. 3, 1946.   J. BELADA   2,407,053
FILING MACHINE
Filed May 27, 1944   2 Sheets-Sheet 2

Inventor
JOHN BELADA
By Rule and Hoge
Attorneys

Patented Sept. 3, 1946

2,407,053

UNITED STATES PATENT OFFICE 2,407,053

FILING MACHINE

John Belada, Glassboro, N. J., assignor to Owens-Illinois Glass Company, a corporation of Ohio Application May 27, 1944, Serial No. 537,744

7 Claims. (Cl. 29—76)

My invention relates to machines for filing and smoothing the sharp or rough peripheral edges of circular caps and other articles. The invention is herein illustrated and described as embodied in a machine adapted for removing flash and smoothing the edges of molded caps or closure devices for bottles, jars, and other containers. Such caps are extensively manufactured from plastic molding compounds by molding processes which leave the articles with a sharp or rough edge. An object of the present invention is to provide an automatic machine for filing or grinding off the flash and leaving a smooth edge.

Other objects of the invention will appear hereinafter.

Referring to the accompanying drawings:

Fig. 1 is a top plan view, with parts broken away, of a machine constructed in accordance with my invention.

Fig. 2 is an elevational view of the machine, parts being broken away.

Figure 3:
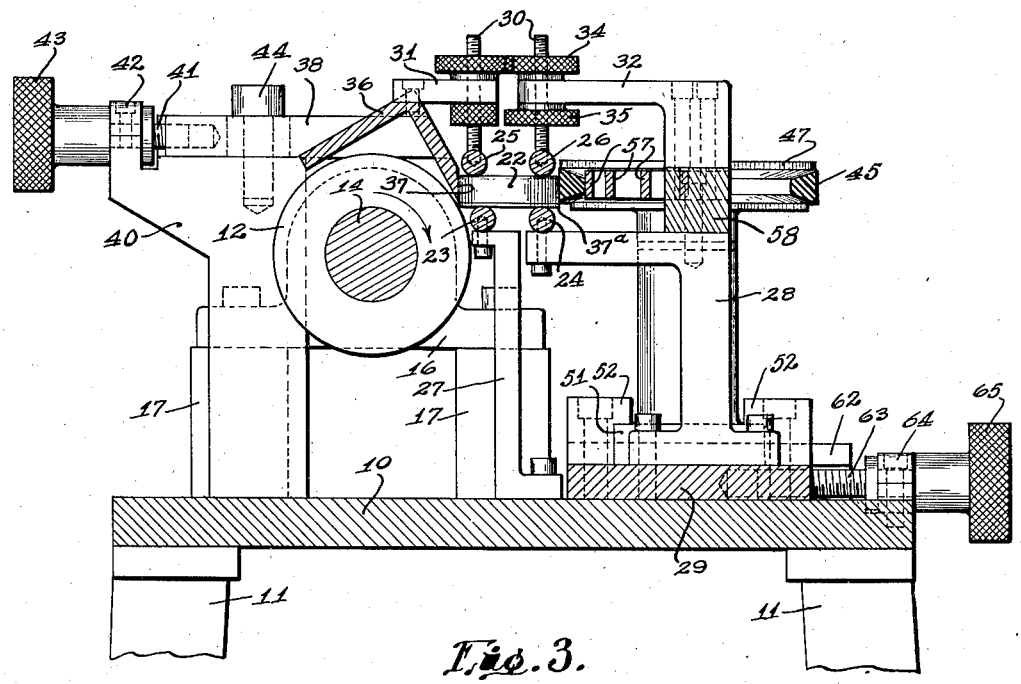
Fig. 3 is a cross sectional elevation on a comparatively large scale, at the line 3—3 on Fig. 1.

The machine comprises a horizontal table or platform 10 mounted on legs 11. The filing element or grinder 12 is in the form of a cylindrical roll comprising a plurality of knurled tubular sections 13 mounted side by side on a shaft 14 which extends beyond the ends of the cylinder and is journaled in bearing blocks 15 and 16. These bearing blocks are mounted on posts 17 or standards, rising from the table 10. The sections 13 are clamped together by means of collars 18 keyed on the shaft 14 at the end of the roll. The roll 12 is rotated continuously by a motor operating through driving connections including a sprocket wheel 20 and chain 21. The cylindrical surface of the roll 12 is knurled, or otherwise roughened to provide a filing or abrading and smoothing surface.

The workpieces 22, herein shown as circular caps, are supported, while traveling through the machine, between a pair of lower supporting rails comprising inner and outer rails 23 and 24 respectively, and a pair of upper rails comprising inner and outer rails 25 and 26 respectively, all of which extend lengthwise of the filing roll 12 at one side thereof. The rail 23 is mounted on brackets 27 bolted to the platform 10. The rail 24 is supported on brackets 28 positioned at intervals therealong and bolted to a plate 29 which is adjustably supported on the platform 10 as hereinafter described. The upper guide rails 25 and 26 are attached to the lower ends of screw-threaded rods 30 supported in brackets 31 and 32. The rails 25 and 26 are individually adjustable up and down to accommodate workpieces of different heights, by means of adjusting knobs 34 threaded on the rods 30 and held in adjusted position by clamping nuts 35.

The brackets 31 are attached to an angle bar 36 positioned over the roll 12 and extending lengthwise thereof. The brackets 32 are mounted on a bar 58 hereinafter described.

The angle bar 36 is formed with a vertically-disposed bearing surface 37 (Fig. 3) for guiding the workpieces as they are advanced along the filing roll with their edges 37ᵃ in contact with the roll and for relieving their pressure against the roll before the filing or abrading action is carried too far. The angle bar 36 is attached at its ends to horizontal bars 38 extending transversely thereof, said bars 38 being adjustably supported on standards 40 on the platform 10. Means for adjusting the angle bar 36 transversely of its length, comprises adjusting rods 41 journaled in bearings 42 on the standards 40 and having screw-threaded connection with the bars 38. Adjusting knobs 43 are attached to the rods 41. Set screws 44 hold the parts in adjusted position.

The workpieces are held against the filing roll 12 and are rolled along the filing surface thereof by a continuously traveling endless belt 45 mounted on a drive pulley 46 and an idler pulley 47. The drive pulley is keyed to a drive shaft 48 journaled in a bearing post 49 bolted to the plate 29. The shaft 48 is driven continuously by a motor (not shown). The idler pulley 47 is mounted to rotate on a shaft 50 attached to a slide block 51 which is supported on the plate 29 and adjustable in guideways 52 for taking up slack in the belt. The adjusting means includes a screw rod 53 threaded through a strap 54 attached to the plate 29. The screw rod is rotatively connected at one end to the slide block 51 and at its outer end carries an adjusting knob 55. The belt 45 may be made of rubber, rubber composition, leather or other suitable material for yieldably and frictionally engaging and rotating the workpieces, and at the same time holding them against the grinding or abrading surface of the roll 12 with the required pressure.

Figure 4:
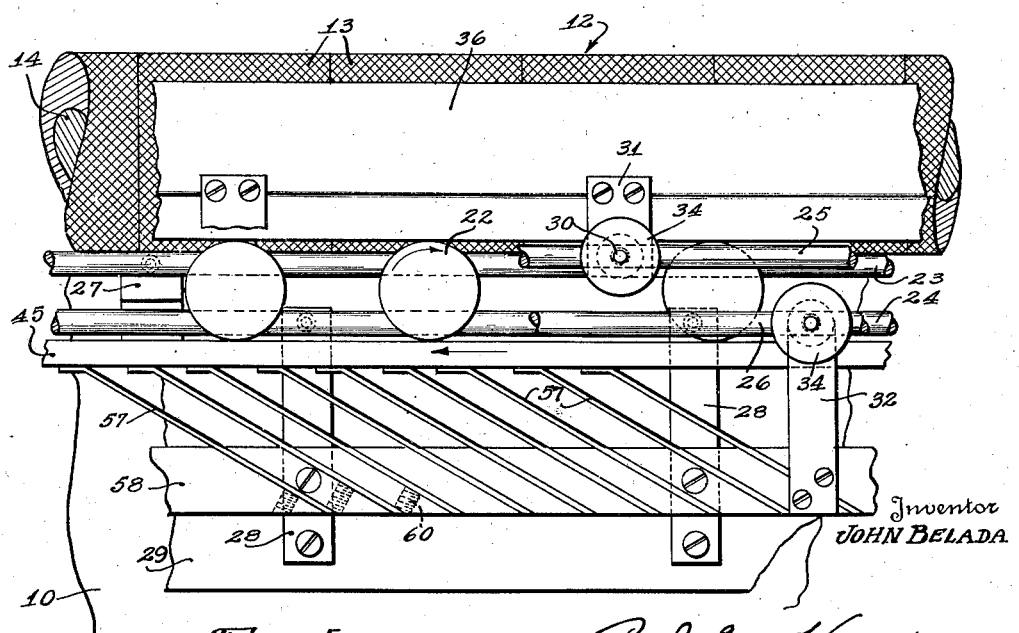
Fig. 4 is a plan view of a portion of the machine, also on a comparatively large scale.

Means for holding the belt against the workpieces with a yielding pressure uniformly distributed along the roll 12, includes a series of leaf springs 57. These springs are arranged in parallel relation and uniformly spaced along and attached to the supporting bar 58 which extends parallel with the belt. The springs are set in diagonal kerfs 59 (Fig. 2) in the bar and secured in place by set screws 60 (Fig. 4). The free end portions of the springs are bent or deflected to extend parallel with and lie flat against the belt. The supporting bar 58 is carried on the brackets 28.

The plate 29 is mounted for adjustment inwardly and outwardly on the platform 10 for adjusting the belt 45 to actuate workpieces of different diameters and also for adjusting the guide rails 24 and 26 along with the belt. End guide plates 62 attached to the platform, overhang the ends of the plate 29 and provide guideways for said plate. The means for adjusting the plate 29 includes adjusting screw rods 63 journaled in bearings 64 on the platform, said screws being threaded into sockets in the plate 29. Adjusting knobs 65 are attached to the outer ends of the screw rods.

The operation is as follows:

The caps 22 are fed into the machine at the right-hand end thereof, between the lower guide rails 23, 24 and the upper guide rails 25, 26. In this position the caps are gripped between the belt 45 and the surface 37 (Fig. 3) of the angle bar 36. The continuously traveling belt carries the cap forward, rolling it along the rotating filing roll 12, thereby removing the flash from the peripheral edge of the workpiece and giving it a smooth surface. The filing roll is of sufficient length to contact the entire circumference of each workpiece several times during its travel along the roll and the abrading surface of the roll may be graduated to provide a coarse or rapidly filing surface for the initial filing, and a finer or polishing surface for putting a smooth finish on the edges of the caps.

Modifications may be resorted to within the spirit and scope of my invention.

I claim:

1. The combination of a cylindrical roll having a knurled surface, a support in which the roll is mounted for rotation, a driving gear connected to the roll, an endless belt mounted at one side of the roll parallel therewith and spaced therefrom, a drive shaft connected to drive said belt, means for supporting a circular workpiece between the belt and said roll with the belt and roll bearing against the workpiece at diametrically opposite points, leaf springs positioned at intervals along the belt, and a stationary support to which one end of each spring is fixed, with the springs extending diagonally forward from their support and their free ends bearing against the belt in position to hold the belt against the workpiece and the workpiece against the roll as the workpiece is rolled along said surface.

2. The combination of a cylindrical roll having a knurled surface, a support in which the roll is mounted for rotation, a driving gear connected to the roll, an endless belt mounted at one side of the roll parallel therewith and spaced therefrom, a drive shaft connected to drive said belt, means for supporting a circular workpiece between the belt and said roll with the belt and roll bearing against the workpiece at diametrically opposite points, said means for supporting the workpiece comprising inner and outer rails mounted and positioned to provide a bottom support for the workpiece, and inner and outer rails positioned to engage the upper surface of the workpiece as the latter advances, said rails extending in parallelism with the roll, and means for adjusting the belt and said outer rails toward and from the said inner rails for adapting the belt and rails to workpieces of different diameters.

3. The combination of a cylindrical roll having an abrading surface, a support in which the roll is mounted for rotation about its axis, an endless belt, supporting means on which the belt is mounted with the belt extending parallel with said roll and spaced laterally therefrom, means for supporting circular workpieces in position between and in contact with the belt and said roll, and means for adjusting the belt and its supporting means toward and from the roll to accommodate workpieces of different diameters, said means for supporting the workpieces comprising rails having a stationary mounting and extending along the roll adjacent thereto and rails extending along the belt adjacent thereto and mounted for adjustment with the belt toward and from the said roll.

4. The combination of a cylindrical abrading roll, a belt mounted to extend along the roll and spaced therefrom, a series of leaf springs positioned at intervals along the belt, a stationary supporting bar on which the said springs are mounted, said springs extending diagonally with respect to the supporting bar and belt and having free end portions parallel with and bearing against the belt in position to yieldingly apply pressure to the belt and to the workpieces rolling along the belt in contact with the abrading roll.

5. The combination of a cylindrical abrading roll, a stationary support in which the roll is mounted for rotation about its axis, an endless belt extending along the roll substantially parallel therewith and spaced therefrom, supporting means on which said belt is mounted, means for adjusting said belt supporting means toward and from the roll, a bar extending along the roll and having a guiding surface adjacent to the roll for engagement with the periphery of a circular workpiece held between the belt and said surface, means for adjusting said bar, toward and from the belt, and rails for supporting and guiding the workpiece, one of said rails being mounted for adjustment with the belt toward and from the abrading roll, and another of said rails being mounted independently of the adjustable belt supporting means.

6. The combination of a cylindrical abrading roll, a stationary support in which the roll is mounted for rotation about its axis, an endless belt extending along the roll substantially parallel therewith and spaced therefrom, supporting means on which said belt is mounted, means for adjusting said belt supporting means toward and from the roll, a bar extending along the roll and having a guiding surface adjacent to the roll for engagement with the periphery of a circular workpiece held between the belt and said surface, means for adjusting said bar toward and from the belt, lower rails forming a bottom support for the workpieces, and upper rails positioned over the path of workpieces, and means for adjusting said upper rails up and down for accommodating workpieces of different heights.

7. The combination of a cylindrical abrading roll, an endless travelling belt, pulleys on which said belt is mounted, said pulleys having their axes perpendicular to that of the roll, the pulleys being positioned to hold a strand of the belt parallel with and spaced from the roll, a series of leaf springs, a stationary support on which the springs are mounted in position to bear against said strand of the belt at intervals thereaong in the direction of travel of said strand and thereby apply a yielding pressure of the belt against workpieces interposed between said strand of the belt and the abrading roll, each of said leaf springs being anchored at one end to said support and extending from its anchored end diagonally inward toward the said strand and forward with respect to the direction of travel of said strand, with the free end of the spring bearing against said strand of the belt.

JOHN BELADA.